(12) United States Patent
Challener

(10) Patent No.: US 6,452,593 B1
(45) Date of Patent: Sep. 17, 2002

(54) METHOD AND SYSTEM FOR RENDERING A VIRTUAL THREE-DIMENSIONAL GRAPHICAL DISPLAY

(75) Inventor: David Carroll Challener, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/253,580

(22) Filed: Feb. 19, 1999

(51) Int. Cl.$^7$ ............................................... G06T 15/00
(52) U.S. Cl. ....................................... 345/419; 345/426
(58) Field of Search .................................. 345/419, 425, 345/426, 430, 156, 157, 679, 582, 427, 418

(56) References Cited

U.S. PATENT DOCUMENTS

| | | | |
|---|---|---|---|
| 5,367,315 A | * 11/1994 | Pan | 345/156 |
| 5,704,024 A | * 12/1997 | Voorhies et al. | 345/426 |
| 5,831,620 A | 11/1998 | Kichury, Jr. | 345/419 |
| 5,977,977 A | * 11/1999 | Kajiya et al. | 345/418 |
| 6,005,582 A | * 12/1999 | Gabriel et al. | 345/430 |
| 6,097,394 A | * 8/2000 | Levoy et al. | 345/419 |

* cited by examiner

Primary Examiner—Cliff N. Vo
Assistant Examiner—Huedung X. Cao
(74) Attorney, Agent, or Firm—J. Bruce Schelkopf; Andrew J. Dillon

(57) ABSTRACT

A method and system for incorporating elements within a user environment into a virtual three-dimensional graphical display of a data processing system. Elements within a user environment are detected. A virtual three-dimensional graphical display of a data processing system is altered to reflect the detected elements within the user environment such that image surfaces within the virtual three-dimensional graphical display which include reflective properties reflect the elements within the user environment.

17 Claims, 6 Drawing Sheets

METHOD AND SYSTEM FOR RENDERING A VIRTUAL THREE-DIMENSIONAL GRAPHICAL DISPLAY

BACKGROUND OF THE INVENTION

1. Field of the Invention

The present invention relates in general to an improved method and system for data processing and in particular to an improved data processing system and method for rendering a virtual three-dimensional graphical display. Still more particularly, the present invention relates to an improved data processing system and method for rendering images reflective of a user environment within a virtual three-dimensional graphical display.

2. Description of the Related Art

Much effort has been put into making images on a video display or screen appear three-dimensional (3D). In movie history, viewers have been supplied special "3D glasses" which made images in "3D movies" appear to pop out of the screen. The 3D movies were produced by displacing the different color layers of the film.

In more recent years, the pursuit of three-dimensional images to provide a virtual reality has revolutionized gaming and animated films. Computer architectures including multiple high-speed processors and 3D accelerator chips are designed to quickly process data for display in three-dimensions. In attempting to create a realistic or virtual three-dimensional view with computer generated graphics, many effects have been developed to trick the eye into seeing in three-dimensions. Data processing systems have been developed which apply these eye-tricking effects to two-dimensional graphics to create the three-dimensional illusion. For example, perspective may be provided by stretching a graphic and distance by muting coloring as objects move farther away. In addition to graphical enhancements, video display units have been adapted to enhance the three-dimensional effect. For example, a video display may wrap around the head to produce "peripheral vision effects." For other effects, cross polarized filters, shuttered lenses, IMAX and headsets have been developed. In addition, 3D sound has been developed to not only trick the eyes, but the ears.

In developing "real" three-dimensional images, a barrier has remained between a user environment and a three-dimensional graphical environment. The disparity between the two environments is evident in reflections from three-dimensional image surfaces within the graphical environment. Inherently reflective elements, such as mirrors displayed with a three-dimensional graphical environment, do not reflect images outside the screen. In addition, for example, gold coins displayed within a virtual three-dimensional image do not reflect the lighting and shadows that are present in the user environment.

Special hardware has been created that allows images created by the computer or software engineer to be displayed as though they are being reflected off a given surface by ray tracing, texture mapping and other advanced three-dimensional techniques. In addition, it may appear as though light is reflecting off surfaces where the light originates at a specific point within the graphical environement. However, these engineered images and lights do not represent images and lights exterior to the video screen. The user experience is not as "real" as possible because a distinct user environment exists apart from the three-dimensional graphical environment.

As should be apparent, an improved method of incorporating reflective images from a user environment into a graphical environment is needed in order to increase the feeling of reality experienced by a user.

SUMMARY OF THE INVENTION

It is therefore one object of the present invention to provide an improved method and system for data processing.

It is another object of the present invention to provide an improved data processing system and method for rendering a three-dimensional graphical display It is yet another object of the present invention to provide an improved data processing system and method for rendering reflective elements of a user environment within a three-dimensional graphical display.

The foregoing objects are achieved as is now described. A method and system are provided for incorporating elements within a user environment into a virtual three-dimensional graphical display of a data processing system. Elements within a user environment are detected. A virtual three-dimensional graphical display of a data processing system is then altered to reflect the detected elements within the user environment, such that image surfaces within the virtual three-dimensional graphical display which include reflective properties reflect the detected elements within the user environment.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
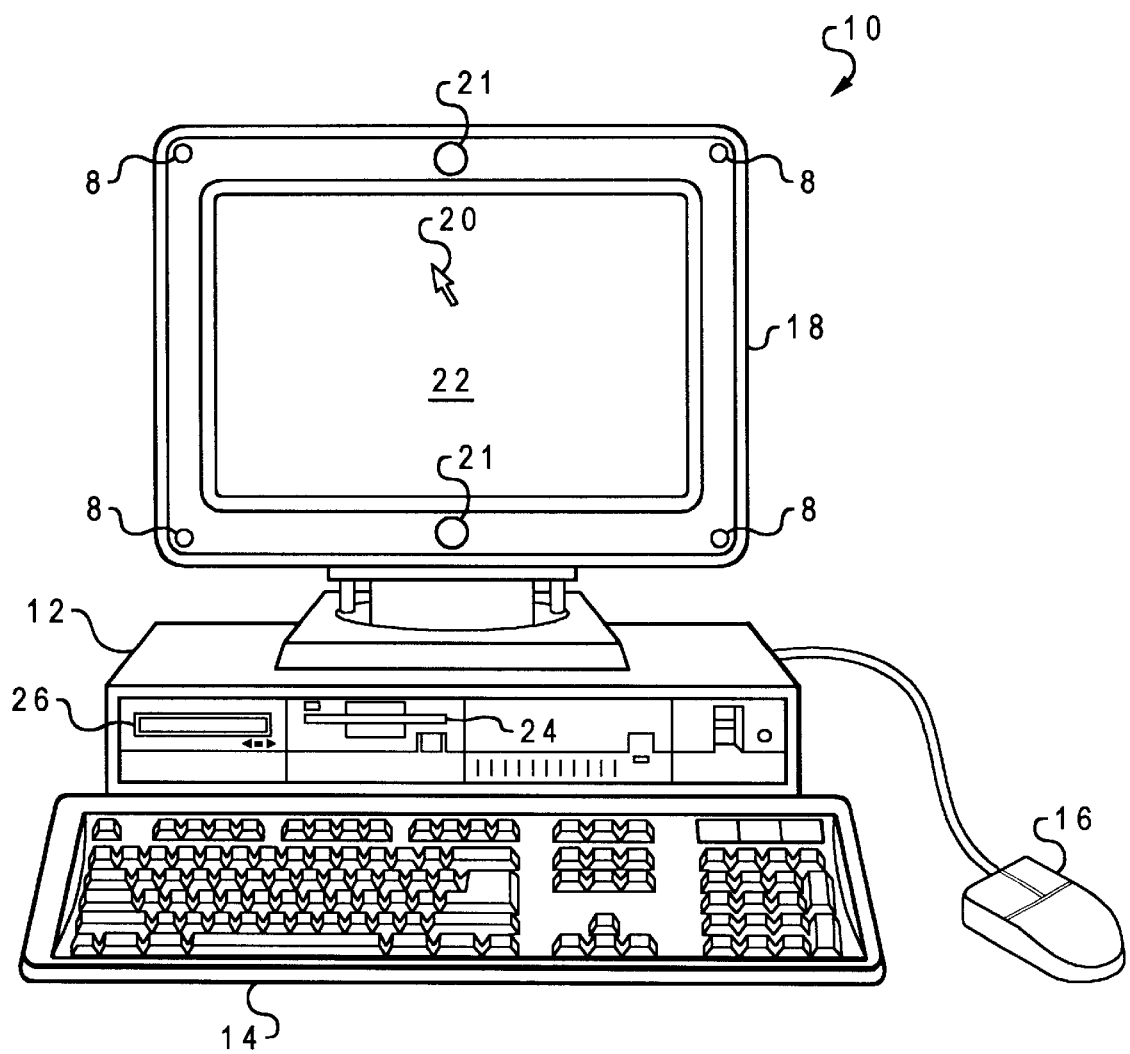
FIG. 1 illustrates a pictorial illustration of a data processing system that can be utilized to implement the present invention.

Referring now to the FIG. 1, and in particular with reference to FIG. 1, there is illustrated a pictorial representation of a data processing system 10, which utilizes an operating system installed therein. Data processing system 10 comprises processor unit 12, keyboard 14, mouse 16, and video display (or monitor) 18. Keyboard 14 and mouse 16 constitute user input devices, and video display 18 constitutes an user output device. Mouse 16 is utilized to control cursor 20 displayed on screen 22 of video display 18. Data processing system 10 supports a Graphical User Interface (GUI) which allows a user to "point-and-click" by moving cursor 20 to an icon or specific location on screen 22 via mouse 16 and then depressing one of the buttons on mouse 16 in order to perform a user command. Floppy disk drive 17 and compact disk drive 15 provide access for processor unit 12 to external data storage devices.

Light sensors 8 and video capture device 21 provide data from the user environment within which data processing system 10 operates. Light sensors 8 are preferably dispersed about the corners of video display 18. Light sensors 8 detect an amount of light present in a user environment. Video capture device 21 is preferably located along a central vertical axis of video display 18. Video capture device 21 may utilize a video camera or other image capturing device able to supply data processing system 10 with an image of the user environment.

Figure 2:
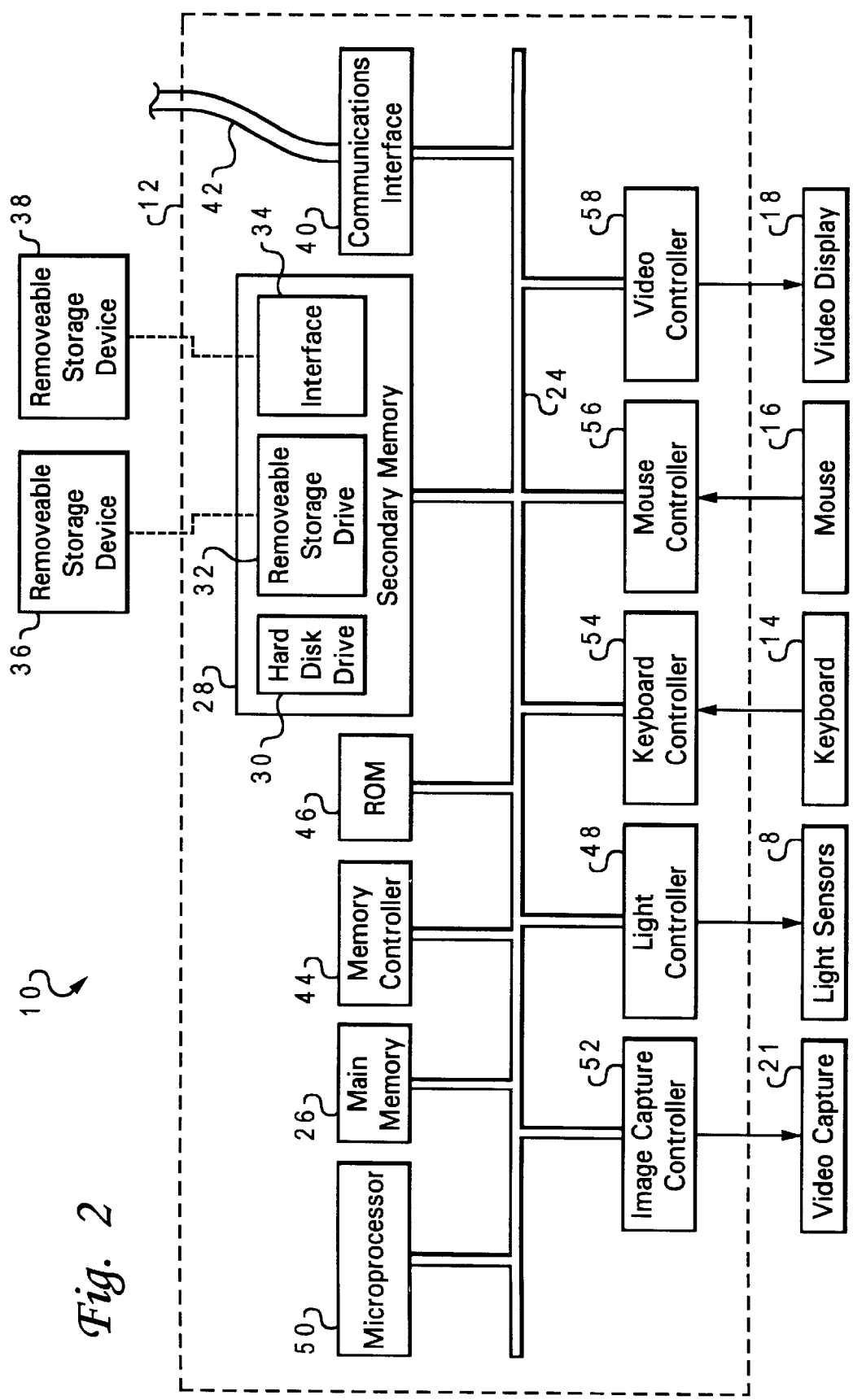
FIG. 2 depicts a more detailed block diagram representation of the processing unit of the data processing system illustrated in FIG. 1.

With reference now to FIG. 2, there is depicted a data processing system environment for implementing the present invention. The environment is a processor unit 12 within data processing system 10 that includes one or more processors such as microprocessor 50. Microprocessor 50 is connected to a system bus 24. Various software embodiments are described in terms of this example data processing system. After reading the description, it will be apparent to a person skilled in the relevant art how to implement the invention using other data processing systems and/or data processing system architectures.

Processor unit 12 also includes a main memory 26, which preferably comprises random access memory (RAM). In addition, a secondary memory 28 may be included. Secondary memory 28 may include, for example, a hard disk drive 30, a removable storage drive 32, and an interface 34. Removable storage drive may represent a floppy disk drive, magnetic tape drive, an optical disc drive, or other data drive which reads and writes to a removable storage unit 36. Removable storage unit 36 represents a floppy disk, magnetic tape, optical disk, or any other data storage device which is read by and written to by removable storage drive 32. As will be appreciated, removable storage unit 36 includes a computer usable storage medium having stored therein computer software and/or data.

In alternative embodiments, secondary memory 28 may include other similar means for allowing computer programs, or other instructions to be loaded into processor unit 12. Such means may include, for example, a removable storage unit 38 and interface 34. Examples may include a program cartridge and cartridge interface, a removable chip (such as EEPROM, PROM, or PCMCIA) and associated socket, and other removable storage units 38 and interfaces 34 which allow software and data to be transferred from removable storage unit 28 to data processing system 10.

Data processing system 10 preferably includes a memory controller 44, connected to system bus 24, for controlling all Direct Memory Access (DMA) operations such as paging data between main memory 26 and secondary memory 28. In addition, random access memory (ROM) 46 contains, among other code, the Basic Input/Output System (BIOS) or other firmware which controls certain basic hardware operations, such as interactions of hard disk drive 30 and removable storage drive 32.

Data processing system 10 may also include a communications interface 40. Communications interface 40 allows software and data to be transferred between data processing system 10 and external devices via communications path 42. Examples of communications interface 40 include a modem, printer, communications port, and other communications supporting hardware. A modem allows data processing system 10 to communicate with other data processing systems over the Internet through a communications path including but not limited to public switched telephone network (PSTN) or ISDN lines. Software and data transferred via communications interface 40 are in the form of signals that can be electronic, electromagnetic, optical, or other signals capable of being received or sent by communications interface 40 via communications path 42. In particular, communications interface 40 provides a means by which data processing system 10 may interface a network such as a LAN.

Within data processing system 10, there are five additional input/output (I/O) controllers, namely, light controller 48, image capture controller 52, keyboard controller 54, mouse controller 56 and video controller 58, all of which are connected to system bus 24. As their names imply, light controller 48 provides the hardware interface for light sensors 8 and image capture controller 52 provides the hardware interface for video capture device 21. Further, keyboard controller 54 provides the hardware interface for keyboard 14, mouse controller 56 provides the hardware interface for mouse 16, and video controller 58 provides the hardware interface for video display 18.

The present invention is preferably implemented utilizing software executing in a data processing system environment similar to that described above with respect to FIG. 2. Thus, the term "computer program product" is used to generally refer to a program stored at removable storage drive 32 or hard disk installed in hard disk drive 30. These computer program products are means for providing software to data processing system 10.

Computer programs or computer control logic are stored in main memory 26 and/or secondary memory 28. Computer programs can also be received via communications interface 40. Such computer programs, when executed, enable data processing system 10 to perform the features of the present invention as discussed herein. In particular, the computer programs, when executed, enable microprocessor 22 to perform the features of the present invention. Accordingly, such computer programs represent controllers of data processing system 10.

Figure 3:
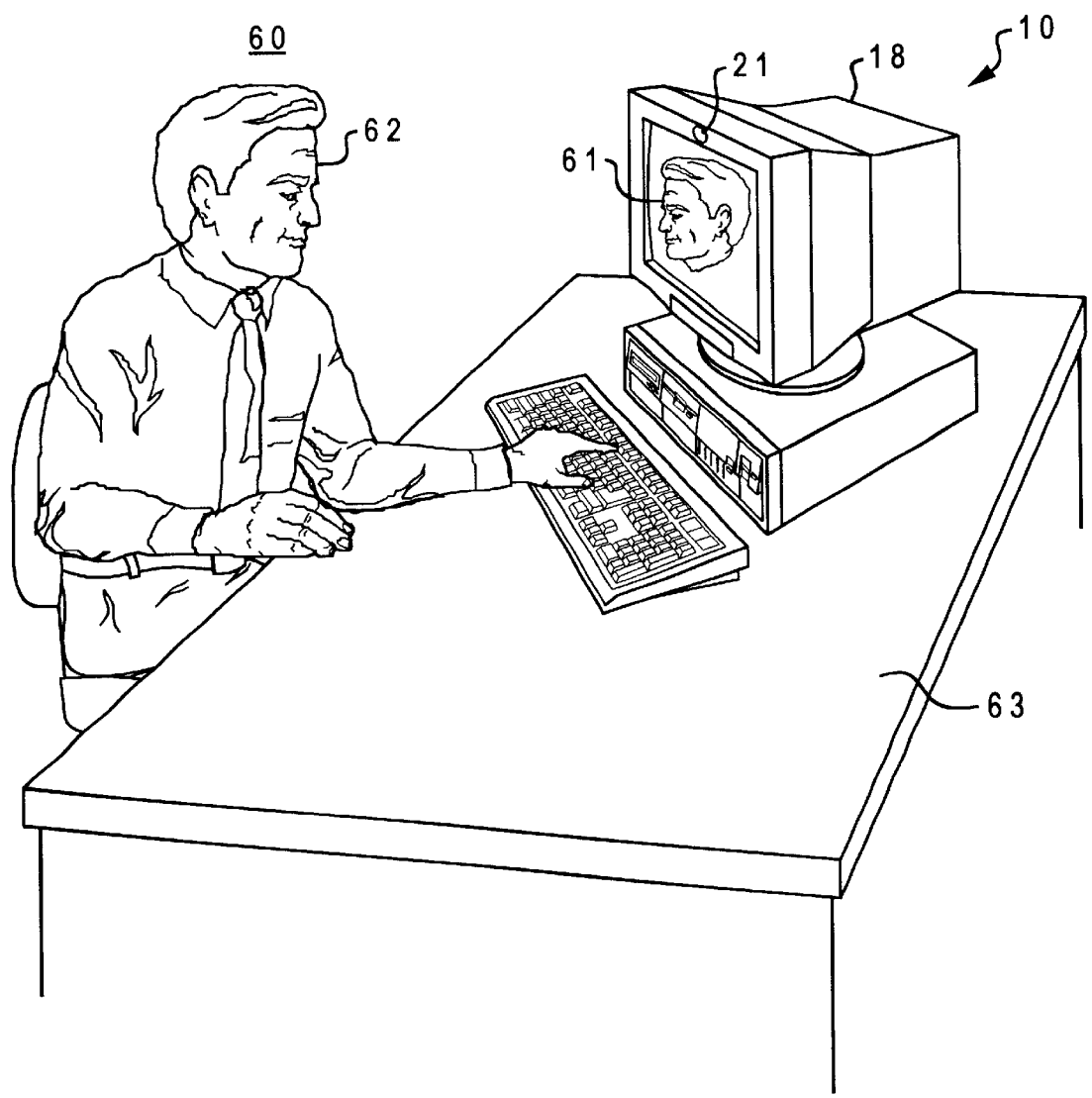
FIG. 3 illustrates a pictorial illustration of a user environment reflected in a graphical environment according to the method and system of the present invention.

Referring now to FIG. 3, there is depicted a pictorial illustration of a graphical environment reflecting a user environment. User environment 60 includes a data processing system 10 including video capture device 21, a user 62, and a table 63 for supporting data processing system 10. Video capture device 21 captures an image of user 62 within user environment 60. A reflection 61 of the image captured of user 62 is displayed within video display 18 of data processing system 10. When user 62 views video display 18, he sees a reflection 61 of himself, as if he were looking in a mirror. The image captured of user 62 may be further integrated into a virtual three-dimensional graphical display within video display 18 as will be further illustrated.

Figure 4:
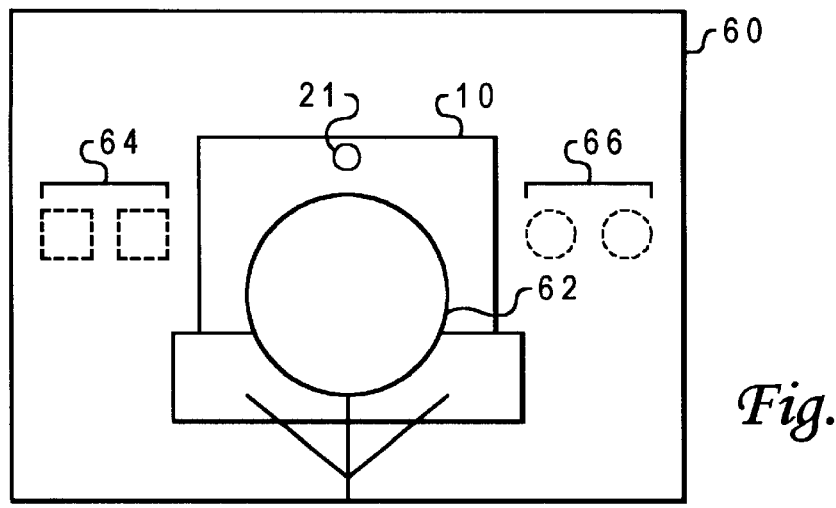
FIG. 4 depicts a pictorial illustration of a user environment from a perspective behind a user according to the method and system of the present invention.

With reference now to FIG. 4, there is depicted a pictorial illustration of a user environment from a perspective behind the user. User environment 60 includes a data processing system 10 including video capture device 21, user 62, and decorative elements 64 and 66 in the shapes of squares and circles. In the example illustrated, square decorative elements 64 are on the user's left side and circle decorative elements are on the user's right side. Decorative images 64 and 66 are for the purpose of illustration.

Figure 5:
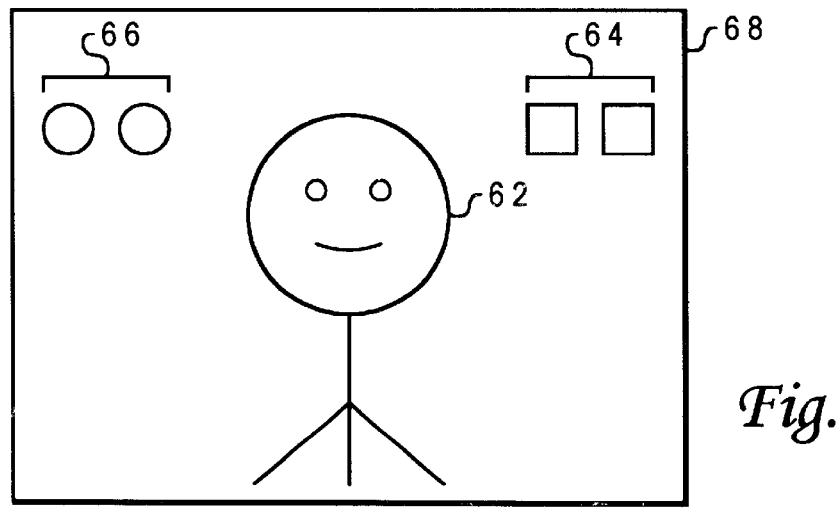
FIG. 5 illustrates a pictorial illustration of an image of a user and other elements captured by a video capture device.

Referring now to FIG. 5, there is illustrated a pictorial illustration of a user environment as captured by video capture device 21. Image 68 is a true view of the user environment and includes user 62 and decorative images 64 and 66. In the example illustrated, square decorative elements 64 are on the user's left side and circle decorative elements are on the user's right side as illustrated in FIG. 4.

Figure 6:
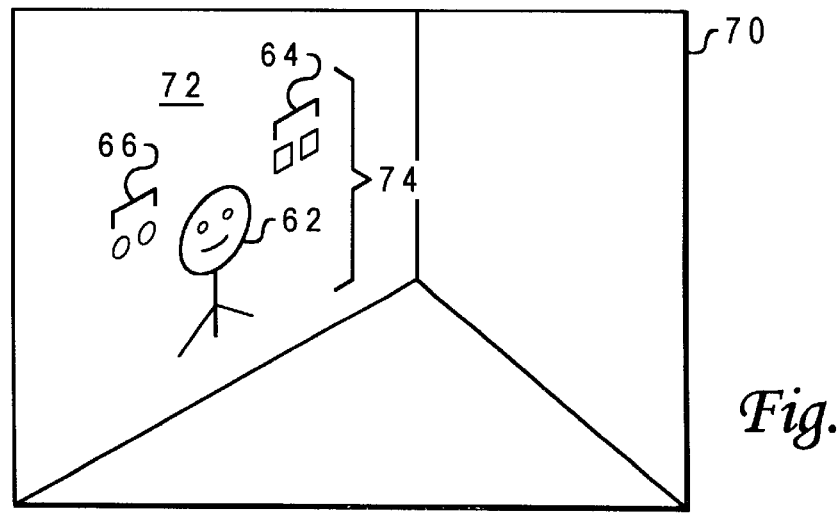
FIG. 6 depicts a pictorial illustration of a user environment reflected in a three-dimensional graphical environment according to the method and system of the present invention.

With reference now to FIG. 6, there is depicted a pictorial illustration of a virtual three-dimensional graphical display 70 in accordance with the present invention. Virtual three-dimensional graphical display 70 includes a mirror 72 containing a reflective image 74 of the user environment 68 captured in FIG. 5. In the reflective image 74, user 62 is depicted where square decorative elements 64 are on the user's left side and circle decorative elements are on the user's right side. With reflective image 74, user 62 can view a reflection of his user environment from reflective elements within virtual three-dimensional graphical display 70. A method such as texture mapping, which is well known in the art, may be utilized to incorporate reflective image 74 with mirror 72. In other embodiments, reflective image 74 may be mapped onto other types of reflective elements including coins, water and other images with inherently reflective properties.

Figure 7:
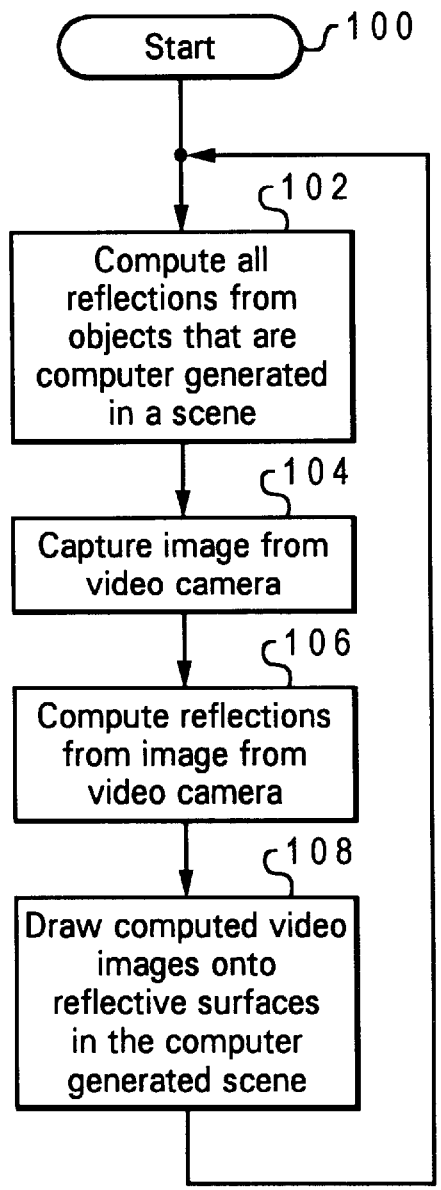
FIG. 7 is a high level logic flowchart illustrating a process performed in response to opening an application which utilizes a three-dimensional graphical display according to the method and system of the present invention.

Referring now to FIG. 7, there is depicted a high level logic flowchart of a process performed in response to opening an application which utilizes a virtual three-dimensional graphical display. As illustrated, the process starts at block 100 and thereafter proceeds to block 102. Block 102 depicts the computation of all reflections from objects that are computer generated in a three-dimensional scene. Thereafter, the process passes to block 104. Block 104 illustrates the capture of an image from a video camera or other image capturing device. For data processing systems which include more than one image capturing device, each would capture an image at block 104. Thereafter, the process proceeds to block 106. Block 106 depicts the computation of reflections from the image captured by the video camera. Thereafter, the process passes to block 108. Block 108 illustrates the drawing of the computed video images onto reflective surfaces in the computer generated scene. Thereafter the process proceeds to block 102. The process iterates as long as scene changes occur in the virtual three-dimensional graphical display.

Figure 8:
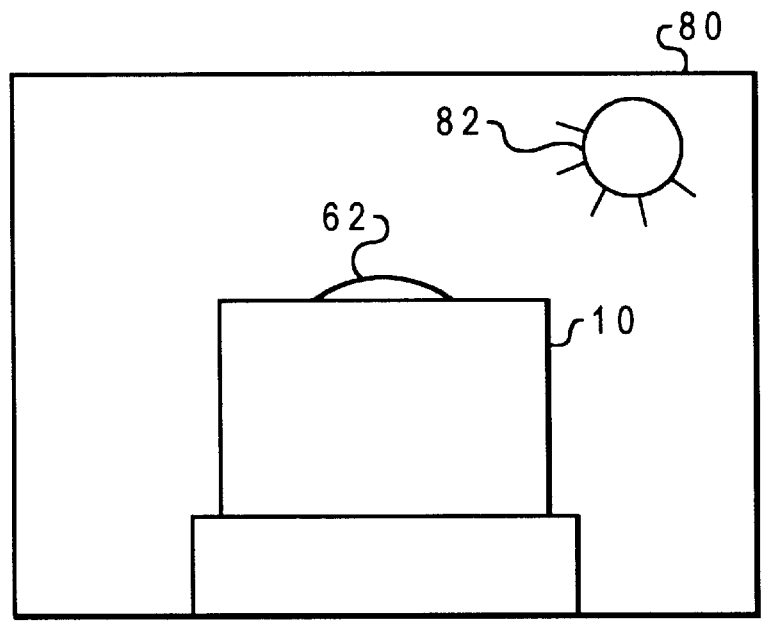
FIG. 8 depicts a pictorial illustration of a user environment from a perspective in front of the user according to the method and system of the present invention.

With reference now to FIG. 8, there is illustrated a pictorial illustration of a user environment 80 from a perspective in front of a user. User environment 80 includes a data processing system 10, a user 62 and a light source 82. Light source 82 is above the left shoulder of user 62.

Figure 9:
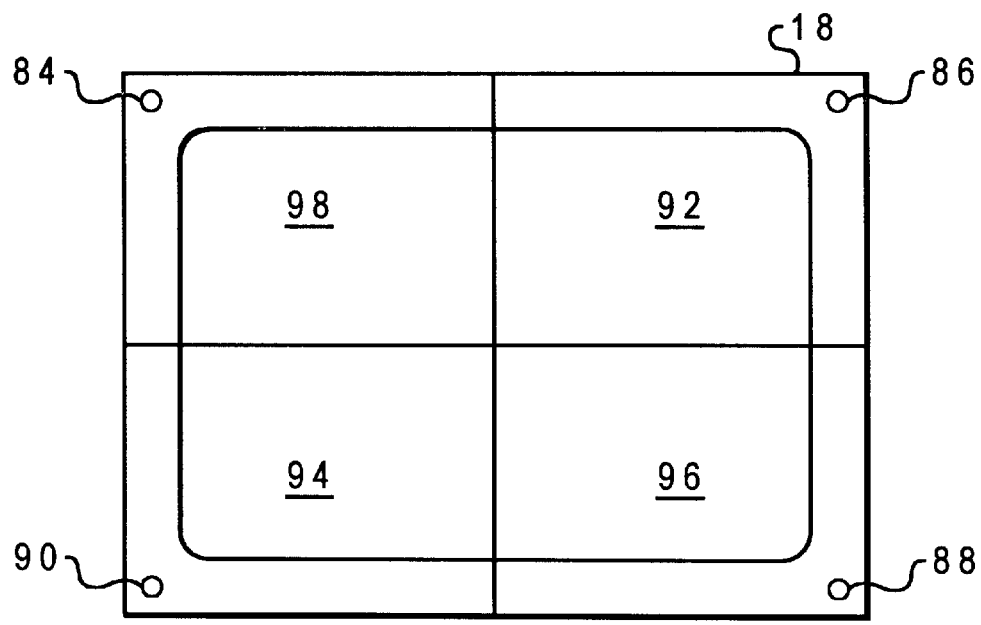
FIG. 9 illustrates a pictorial illustration of a display device according to the method and system of the present invention.

Referring now to FIG. 9, there is depicted a pictorial illustration of a display device 18. Display device includes four light sensors 84, 86, 88 and 90. Each light sensor represents a distinct quadrant. Light sensor 84 is contained within quadrant 98, light sensor 84 is contained within quadrant 92, light sensor 88 is contained within quadrant 96 and light sensor 90 is contained within quadrant 94. From the light detected by each light sensor, a quadrant within which a main light source originates and a position within the quadrant may be determined. In other embodiments, the quadrants may represent three-dimensional spaces. In the present example, light sensor 84 would detect the most light of the light sensors from light source 82. By comparing the light sensed by each light sensor, a light source would be inferred within quadrant 98.

Figure 10:
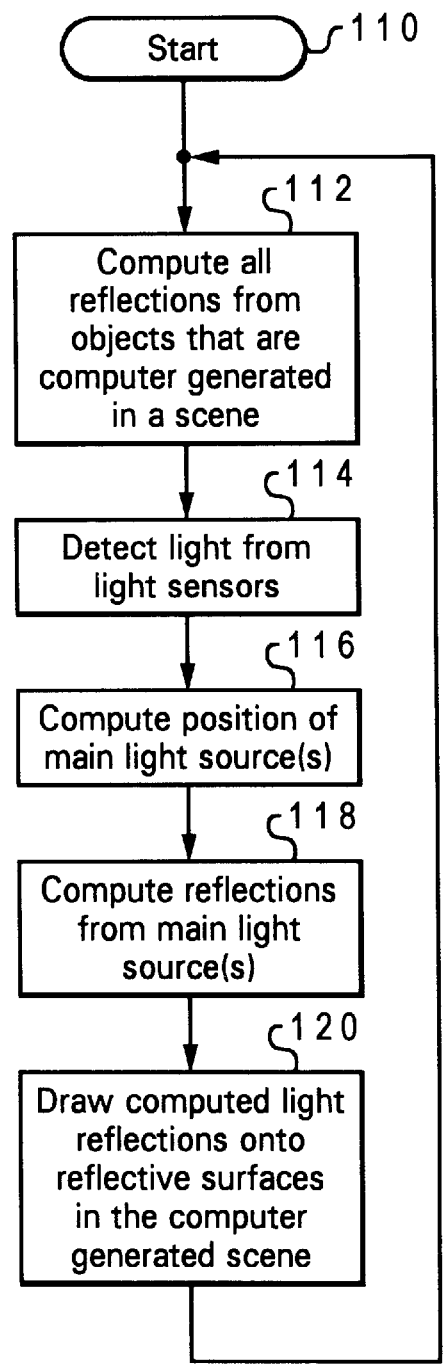
FIG. 10 is a high level logic flowchart illustrating a process performed in response to opening an application which utilizes a three-dimensional graphical display according to the method and system of the present invention.

With reference now to FIG. 10, there is illustrated a high level logic flowchart of a process performed in response to opening an application which utilizes a virtual three-dimensional graphical display. As depicted, the process starts at block 110 and thereafter proceeds to block 112. Block 112 illustrates the computation of all reflections from objects that are computer generated in a scene. Thereafter, the process passes to block 114. Block 114 depicts the detection of light from light sensors. Thereafter the process proceeds to block 116. Block 116 illustrates the computation of the position of a main light source or sources. Utilizing the variant amounts of light detected by each light sensor, the data processing system can infer the position of a main light source or sources in the user environment. Thereafter, the process passes to block 118. Block 118 depicts the computation of reflections from the main light source(s). Thereafter, the process passes to block 120. Block 120 illustrates the drawing of the computed light reflections onto reflective surfaces in the computer generated scene utilizing a method such as ray tracing which is well known in the art for providing a light source from which reflections are traced.

While the invention has been particularly shown and described with reference to a preferred embodiment, it will be understood by those skilled in the art that various changes in form and detail may be made therein without departing from the spirit and scope of the invention. For example, while inputs to a image capture device and light sensors have been utilized separately to provide reflective elements, a combination of the image and light sensed may be incorporated within a single three-dimensional display.

What is claimed is:

1. A method of incorporating elements within a user environment into a pre-existing virtual three-dimension graphical display of a data processing system, said pre-existing virtual three-dimensional graphical display including at least one image surface having reflective properties, said method comprising the steps of:

detecting elements within a user environment; and
   altering a pre-existing virtual three-dimensional graphical display of a data processing system to reflect said detected elements within said user environment such that any image surfaces within said pre-existing virtual three-dimensional graphical display which include reflective properties reflect said elements within said user environment.

2. The method of incorporating elements within a user environment into a pre-existing virtual three-dimensional graphical display of a data processing system according to claim 1, said method further comprising the steps of:

computing reflective image from said detected elements within said user environment.

3. The method of incorporating elements within a user environment into a pre-existing virtual three-dimensional graphical display of a data processing system according to claim 2, said step of altering a pre-existing virtual three-dimensional graphical display of a data processing system to reflect said detected elements within said user environment such that image surfaces within said pre-existing virtual three-dimensional graphical display which include reflective properties reflect said elements within said user environment further comprising the step of; texture mapping said computed reflective images onto said images surfaces within said pre-existing virtual three-dimensional graphical display which include reflective properties.

4. The method of incorporating elements within a user environment into a pre-existing virtual three-dimensional graphical display of a data processing system according to claim 1, said step of detecting elements within a user environment further comprising the step of:

capturing a current image o at least one view within said user environment.

5. The method of incorporating elements within a user environment into a pre-existing virtual three-dimensional graphical display of a data processing system according to claim 1, said step of detecting elements within a user environment further comprising the step of: sensing light from at least a point within said user environment.

6. A system for incorporating elements within a user environment into a pre-existing virtual three-dimension graphical display of a data processing system, said pre-existing virtual three-dimensional graphical display including at least one image surface having reflective properties, said system comprising:

means for detecting element s within a user environment;

means fox altering said re existing virtual three-dimensional graphical display of a data processing system to reflect said detected elements within said user environment that any image surfaces within said pre-existing virtual three-dimensional graphical display which include reflective properties reflect said elements within said user environment.

7. The system for incorporating elements within a user environment into a pre-existing virtual three-dimensional graphical display of a data processing system according to claim 6, said system further comprising:

means for computing reflective images from said detected elements within said user environment.

8. The system for incorporating elements within a user environment into a pre-existing virtual three-dimensional graphical display of a data processing system according to claim 7, said means for altering a pre-existing virtual three-dimensional graphical display of a data processing system to reflect said detected elements within said user environment such that image surfaces within said pre-existing virtual three-dimensional graphical display which include reflective properties reflect said elements within said user environment further comprising:

means for texture mapping aid computed reflective images onto said images surfaces within said pre-existing virtual three-dimensional graphical display which include reflective properties.

9. The system for incorporating elements within a user environment into a pre-existing virtual three-dimensional graphical display of a data processing system according to claim 6, said means for detecting elements within a user environment further comprising: means for capturing a current image of at least one view within said user environment.

10. The system for incorporating elements within a user environment into a pre-existing virtual three-dimensional graphical display of a data processing system according to claim 9, said means for capturing a current image of at least one view within said user environment further comprising at least one video camera.

11. The system for incorporating elements within a user environment into a pre-existing virtual three-dimensional graphical display of a data processing system according to claim 6, said means for detecting a elements within a user environment further comprising; means for sensing light for at least one point within said user environment.

12. The system for incorporating elements within a user environment into a pre-existing virtual three-dimensional graphical display of a data processing system according to claim 11, said means for sensing light from at least one point within said user environment further comprising a plurality of light sensors.

13. A program product for incorporating elements within a user environment into a pre-existing virtual three-dimensional graphical display of a data processing system, said pre-existing virtual three-dimensional graphical display including at least one image surface having reflective properties, said program product comprising:

a data processing system usable medium;

a reflection program encoded within said data processing system usable medium that, in response to detecting elements wit in a user environment;

alters a pre-existing virtual three-dimensional graphical display of a data processing system to reflect said detected elements within said user environment such that any image surfaces within said pre-existing virtual three-dimensional graphical display which include reflective properties reflect said elements within said user environment.

14. The program product according to claim 13, wherein said reflection program:

computes reflective images from said detected elements within said user environment.

15. The program product according to claim 14, wherein said refection program: texture maps said compute reflective images onto said images surfaces within said pre.

16. The program product according to claims 15, wherein said reflection program:

captures a current image of at least one view within said user environment.

17. The program product according to claim 13, wherein said reflection program:

senses light from at least one point within said user environment.

* * * * *

UNITED STATES PATENT AND TRADEMARK OFFICE
CERTIFICATE OF CORRECTION

| | | |
|---|---|---|
| PATENT NO. | : 6,452,593 B1 | Page 1 of 1 |
| APPLICATION NO. | : 09/253580 | |
| DATED | : September 17, 2002 | |
| INVENTOR(S) | : David Carroll Challener | |

It is certified that error appears in the above-identified patent and that said Letters Patent is hereby corrected as shown below:

In Column 8, line 32, please remove "wit in" and insert --within--.

In Column 8, line 32, please remove the ";" after "user environment" in the second claim element and insert a --,-- and the "," should be immediately followed by the text of the third element (starting with "alters"), rather than the third element being its own separate paragraph.

Signed and Sealed this
Twenty-eighth Day of February, 2012

David J. Kappos
*Director of the United States Patent and Trademark Office*